United States Patent Office 2,976,234
Patented Mar. 21, 1961

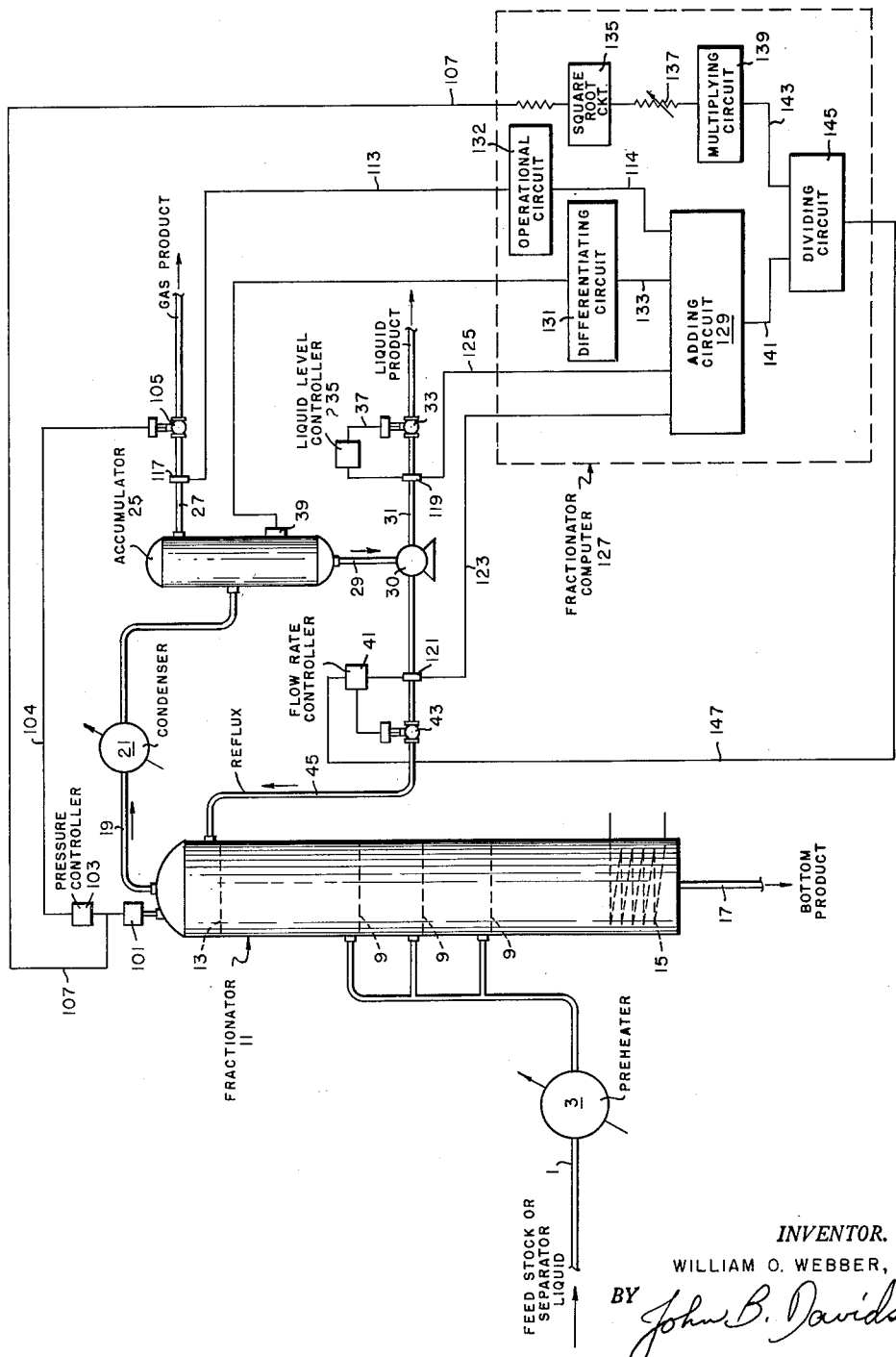

2,976,234

CONTROL OF FRACTIONATING COLUMNS

William O. Webber, Baytown, Tex., assignor, by mesne assignments, to Esso Research and Engineering Company, Elizabeth, N.J., a corporation of Delaware Filed July 10, 1959, Ser. No. 826,281

6 Claims. (Cl. 208—350)

This invention relates to the control of the operation of a fractionating column, and more particularly to a control system for a fractionating column that will permit the column to be operated at maximum capacity under any given load condition without danger of spillover from the fractionating plates thereof.

In a usual fractionating system, the mixed or multi-component feed stock is charged to approximately the midpoint of the fractionating column. The column is a vertically disposed chamber having a plurality of spaced fractionating plates or bubble cap trays. The fractionating plates are adapted to hold feed stock components as a liquid and are provided with means for passing vaporized feed stock therethrough. The liquid components flow downwardly through the column, and the vaporized components ascend upwardly through the column. The rate of ascent of the vaporized material is a function of the load on the column. If too great a load is placed on the column, the vaporized material may entrain excessive amounts of liquefied material on the fractionating plates and the liquid handling capacity of the column may be exceeded. Unless the operating conditions of the tower are correct, flooding of the tower may occur.

For the purpose of maintaining a proper heat balance in the fractionating column and to facilitate rectification of the components within the upper portion of the column, reflux is normally returned to the top of the column in a regulated quantity. The heat applied to the column, the products taken from the column, and the reflux returned to the column must be in very critical balance in order to effect maximum separation of the components of the feed stock and to prevent product loss by spillage of the liquefied material in the fractionating plates.

Various systems and methods have been devised in the past for the control of a fractionating column. For various reasons, these systems and methods have been more or less unsatisfactory. Few, if any, provide reliable, safe operation of a fractionating column at greater than 90 percent of theoretical maximum capacity thereof. The prior art is typified by the following U.S. patents: No. 2,816,858—Walker; No. 2,456,398—Gerhold; No. 2,588,303—Spanley; and No. 2,725,351—Grote.

In accordance with the teachings of the present invention, control of a fractionating column is exercised by regulating the reflux rate of the tower. This is done by computing the ratio of the actual vapor rate of the tower to its theoretical maximum vapor capacity, and varying the reflux rate to keep the ratio less than and as close as possible to unity. The theoretical maximum vapor capacity of a tower is known to vary as the product of an entrainment constant and the square root of the absolute pressure above some critical fractionating plate. The actual vapor capacity may be found by determining the sum of the reflux, the liquid product, the gaseous product, and the rate of change of the liquid content in the condensate receiver into which the vaporized portion of the fractionating column output is fed and applying a correction factor to arrive at the vapor rate inside the tower. By deriving a quantity indicative of the ratio of this sum to the square root of the absolute pressure above the topmost bubble tray and utilizing this quantity to control the reflux rate to the tower so that the ratio is substantially unity, the tower will be found to operate at substantially its theoretical maximum capacity.

The invention will be further described with reference to the accompanying drawing, the single figure of which illustrates an embodiment of the invention.

The fractionating column 11 is of the conventional type utilizing a multiplicity of vertically-stacked fractionating plates, also termed bubble trays or bell cap trays. Only the topmost fractionating plate 13 and the plates 9 into which feed stock is injected are shown in the drawing. Feed stock from line 1 is passed through a preheater 3 before being introduced into the fractionating plates 9. As is conventional, a reboiler 15, which may be either of the internal or of the external type, is utilized, and a bottom product line 17 is provided, from which the heavy liquid bottom product may be carried from the tower.

The vaporized products of the tower are carried away through an overhead products line 19 and are condensed by condenser 21 before being introduced into the condensate receiver or accumulator 25. Uncondensed vapors and gases are vented through line 27 and control valve 105 while the resulting condensed overhead products stream is withdrawn from the lower end of condensate receiver 25 by way of line 29, pump 30, line 31, and control valve 33. A portion of the condensate is returned to the upper end of the column 11 as reflux through valve 43 and line 45. The quantity of condensate passing from the system by way of line 31 is regulated by liquid level controller 35 connected to flow rate detector 119 by an electrical lead, and to valve 33 by an electrical or mechanical connection 37. Likewise, the rate of flow of reflux through valve 43 is controlled by a flow rate controller 41 of conventional design. Vaporized product from the system passing out through line 27 is controlled by a pressure controller 103 connected to valve 105 by a suitable electrical or mechanical connecting means 104. The pressure controller is actuated by a suitable pressure measuring means 101 which measures the pressure in the space above the topmost bubble tray 13. Reflux may be introduced back into the fractionating column at the top thereof and/or one of the lower trays in the usual manner.

Other usual apparatus may be provided, such as a liquid level controller to regulate the rate of liquid withdrawal from the bottoms output line 17.

The control signal for liquid level controller 35 may be derived from a suitable liquid level detecting means 39, the output from which is an electrical signal having a magnitude indicative of the level of the liquid within the condensate receiver 25. Suitable liquid flow rate detectors 121 and 119 are connected in lines 45 and 31 to respectively measure the rate of flow of reflux and the rate of flow of liquid products from the system. Likewise, a gas flow rate detector or transducer 117 is placed in line 27 to measure the flow rate of gases through line 27. Devices of this nature are well known to the art and may comprise an orifice and means for deriving an electrical signal indicative of the pressure across the orifice. Likewise, the pressure transducer 101 is adapted to produce an electrical signal for controlling pressure controller 103. The electrical signals of pressure transducer 101 and flow rate detectors 117, 119, and 121, and the output signal of liquid level detector or transducer 39 are all coupled to a fractionator computer 127, the output signal of which appears on electrical line 147 to control flow rate controller 41. The outut signal of flow rate detector or transducer 121 also is connected to flow rate controller 41 for the control thereof.

The output signal of liquid level detector 39 is differentiated by a differentiating circuit 131 to produce a signal on line 133 indicative of the rate of change of the volume of liquid in condensate receiver 25. The output signal from gas flow rate detector 117 is applied to an operational circuit 132, the function of which is to reduce the signal on line 113 to a level indicative of the flow rate if the gases passing through line 27 were liquid. Suitable operational amplifiers (not shown) may be incorporated in lines 123 and 125, if necessary, to compensate for inaccuracies in the output signals of the flow rate detectors 119 and 121. All of the signals appearing on lines 123, 125, 133, and 114 are added together by means of adding circuit 129 to produce an output signal indicative of the actual rate at which vapors pass through the overhead product line 19 from the tower.

The output signal from pressure transducer 101 is connected by line 107 to a square root taking circuit 135 for deriving an output signal indicative of the square root of the pressure in the space above the topmost fractionating plate 13. This output signal is thereupon applied to a multiplying circuit 139 which is controlled by resistor 137. The function of the multiplying circuit 139 and resistor 137 is to multiply the output signal from square root taking circuit 135 by the entrainment constant of the tower. This entrainment constant may be found by operating the tower at a rate at which liquids begin to spill from the most loaded fractionating plate, measuring the pressure in the space above the topmost plate at that time, and dividing the rate of reflux, the rate of product removal from the system, and the rate of change of condensate in the condensate receiver by the square of the measured pressure. An output signal will be derived on line 143 which will be indicative of the theoretical maximum capacity at which the tower can operate at the operating pressure in the space above the topmost fractionating plate.

Milliammeters may be inserted in the output circuits of adding circuit 129 and multiplying circuit 139 to provide an indication of the operating efficiency of the system.

The signals on lines 141 and 143 are applied to a dividing circuit 145, the function of which is to derive an output signal indicative of the ratio of the signal on line 141 to the signal on line 143. This signal is applied to flow rate controller 41. The flow rate controller regulates the amount of reflux passing back into the fractionating column so that the amplitude of the output signal appearing on line 147 is less than, but as near as possible to, an amplitude indicating that the ratio of the signal on line 141 to the signal on line 143 is unity.

The liquid level controller 35 operates in the usual manner to keep the level of the liquid in the condensate receiver 25 at a desired level. This is done by controlling the rate of discharge of liquid products from the system. Since the rate at which gases are evolved from the system through line 27 determines the pressure in the top of the fractionating column, the pressure controller 103 regulates the pressure in the top of the column by controlling the rate at which gases are evolved from the system through line 27.

The system described above is started up in the usual manner with the computer output disconnected from the rate of reflux controller 145. When the tower is operating smoothly at about 90% capacity and controlled by conventional means, the output of circuit 139 will be adjusted to a value indicative of 90% of capacity by varying resistor 137. The computer may then be connected to control the reflux of flow controller 41. More conveniently, this may be done by connecting the output of the controller to control the conventional recording pin of the controller 41. The output from computer 127 will be a function of its error, that is, the difference between the actual capacity at which the system is operating and the maximum capacity as determined by the output of circuit 139. When this error is zero, the output will be zero and no change will be made to the reflux rate. If the measured efficiency changes, then an output to the reflux rate of flow controller index pin will cause the reflux index pin to change, creating an error in the reflux rate of flow controller which will cause an output from the reflux controller to the reflux control valve 43.

Changes in the operating conditions of the tower will be reflected in the computer to produce compensating reflux changes. For example, a change in the ambient temperature of the air would cause the temperature of the overhead product to change, varying the gas rate production, and this would in turn vary the reflux through the controller in order to keep the total vapor rate constant. Likewise, if the rate of product withdrawal should be increased, the vapor rate would also tend to be increased. This would be reflected through the controller to reduce reflux in order to maintain the vapor rate constant.

If the feed rate is increased, the percentage yield of overhead product would then be reduced and the product quality would be changed; in order to compensate for this it is necessary to increase the rate of overhead product removal; this would, of course, reduce the reflux rate in order to keep the vapor rate constant.

The electrical circuits utilized in the fractionator computer 127 may be of many types. Suitable circuits for the purposes indicated may be found in the text "Electronic Analog Computers," by G. A. Korn and T. M. Korn (McGraw-Hill), 1956. Other circuits known to the prior art may be utilized, including those based on magnetic amplifiers, semiconductive devices, and the like.

The control system described above has been found to be eminently satisfactory in operation. Whereas most control systems used in the past have seldom been able to operate at greater than 90 percent of theoretical maximum capacity without constant danger of spillover, the system of the present invention has operated at 100 percent of maximum capacity for extended periods of time without spillover. When it is realized that a fractionating tower involves a capital investment of many hundreds of thousands of dollars, it can be readily appreciated that an increase of 10 percent in the operating capacity of a fractionating tower is of great significance.

What is claimed is:

1. Apparatus for fractionally distilling hydrocarbon oils, comprising: a fractionating column including a plurality of vertically disposed fractionating plates; first means connected to said column for introducing feed stock into the column; second means connected to the column above the topmost fractionating plate for withdrawing vapors from the tower and for condensing at least a portion of the vapors; a condensate receiver connected to said second means for receiving and temporarily storing the condensed vapors; third means connected to said condensate receiver for withdrawing products from the system; a reflux line between said condensate receiver and said fractionating column for returning reflux to said column; first transducer means connected above the topmost plate of said column for deriving an electrical signal indicative of the pressure in the space above the topmost plate; second transducer means connected to the condensate receiver for deriving an electrical signal indicative of the rate of change of condensate in said condensate receiver; third transducer means connected to said third means for deriving an electrical signal indicative of the rate at which products are withdrawn from the system through said third means; fourth transducer means connected to said reflux line for deriving an electrical signal indicative of the flow rate of reflux through said reflux line into said fractionating column; summing circuit means connected to said second, third, and fourth transducer means for electrically summing the output signals of said second, third, and fourth transducer means to derive an electrical signal indicative of the rate at which vapors are withdrawn from said fractionating column by said second means; function circuit means electrically connected to said first transducer means for deriving an output signal indicative of the square root of the pressure in the column multiplied by the entrainment constant of the column obtained by operating the column at a rate at which the most loaded tray begins to spill liquids therein, measuring the pressure in the space above the topmost plate, and dividing the volume of the rate of reflux, the rate of product removal, and the rate of change of condensate in said condensate receiver by the square root of the measured pressure; valve means in said reflux line adapted to control the rate of reflux flow into said fractionating column; means connected to said valve means, to said function circuit means, and to said summing circuit means for deriving an electrical signal indicative of the ratio between the product of the square root of the pressure in the space above the topmost fractionating plate and the entrainment constant of the column, and the sum of the products evolved from the system by said third means, the rate of reflux flow, and the rate of change of liquids in said condensate receiver; said last-named means being further adapted to control said valve means with said electrical signal to bring said ratio as near as possible to unity.

2. Apparatus for fractionally distilling hydrocarbon oils, comprising: a fractionating column including a plurality of vertically disposed fractionating plates; first means connected to said column for introducing feed stock into the column; second means connected to the column above the topmost fractionating plate for withdrawing vapors from the tower and for condensing at least a portion of the vapors; a condensate receiver connected to said second means for receiving and temporarily storing the condensed vapors; third means connected to said condensate receiver for withdrawing products from the system; a reflux line between said condensate receiver and said fractionating column for returning reflux to said column; first transducer means connected above the topmost plate of said column for deriving an electrical signal indicative of the pressure in the space above the topmost plate; second transducer means connected to the condensate receiver for deriving an electrical signal indicative of the rate of change of condensate in said condensate receiver; third transducer means connected to said third means for deriving an electrical signal indicative of the rate at which products are withdrawn from the system through said third means; fourth transducer means connected to said reflux line for deriving an electrical signal indicative of the flow rate of reflux through said reflux line into said fractionating column; summing circuit means connected to said second, third, and fourth transducer means for electrically summing the output signals of said second, third, and fourth transducer means to derive an electrical signal indicative of the rate at which vapors are withdrawn from said fractionating column by said second means; function circuit means electrically connected to said first transducer means for deriving an output signal indicative of the square root of the pressure in the column multiplied by the entrainment constant of the column obtained by operating the column at a rate at which the topmost plate begins to spill liquids therein, measuring the pressure in the space above the topmost plate, and dividing the volume of the rate of reflux, the rate of product removal, and the rate of change of condensate in said condensate receiver by the square root of the measured pressure; valve means in said reflux line adapted to control the rate of reflux flow into said fractionating column; dividing circuit means connected to said function circuit means and to said summing circuit means for deriving an electrical signal indicative of the ratio of the product of the entrainment constant of the fractionating column and the square root of the pressure in the space above the topmost plate, to the sum of the products evolved from the system by said third means, the rate of reflux flow, and the rate of change of liquids in said condensate receiver; fluid flow regulating means connected to said valve means, and to said fourth transducer means and said dividing circuit means, for regulating the flow rate of reflux as a function of the output signal of said dividing circuit means to bring said dividing circuit means output signal to a value corresponding to a value of unity for said ratio.

3. Apparatus for fractionally distilling hydrocarbon oils, comprising: a fractionating column including a plurality of vertically disposed fractionating plates; first means connected to said column for introducing feed stock into the column; second means connected to the column above the topmost fractionating plate for withdrawing vapors from the tower and for condensing at least a portion of the vapors; a condensate receiver connected to said second means for receiving and temporarily storing the condensed vapors; third means connected to said condensate receiver for withdrawing products from the system; a reflux line between said condensate receiver and said fractionating column for returning reflux to said column; first transducer means connected above the topmost plate of said column for deriving an electrical signal indicative of the pressure in the space above the topmost plate; second transducer means connected to the condensate receiver for deriving an electircal signal indicative of the rate of change of condensate in said condensate receiver; third transducer means connected to said third means for deriving an electrical signal indicative of the rate at which products are withdrawn from the system through said third means; fourth transducer means connected to said reflux line for deriving an electrical signal indicative of the flow rate of reflux through said reflux line into said fractionating column; electrical circuit means connected to said first, second, third, and fourth transducer means for deriving an electrical signal indicative of the sum of the products evolved from the system through said third means, the rate of reflux flow, and the rate of change of liquids in said condensate receiver, divided by the product of the entrainment constant of the fractionating column and the square root of the pressure in the space above the topmost fractionating plate; and means connected to said valve means and said electrical circuit means for controlling said valve means with said electrical signal from said electrical circuit means to bring said electrical signal derived by said electrical circuit means to a value corresponding to a value of unity for the ratio of said sum to said product.

4. Apparatus for fractionally distilling hydrocarbon oils, comprising: a fractionating column including a plurality of vertically disposed fractionating plates; first means connected to said column for introducing feed stock into the column; second means connected to the column above the topmost fractionating plate for withdrawing vapors from the tower and for condensing at least a portion of the vapors; a condensate receiver connected to said second means for receiving and temporarily storing the condensed vapors; third means connected to said condensate receiver for withdrawing products from the system; a reflux line between said condensate receiver and said fractionating column for returning reflux to said column; first transducer means connected above the topmost plate of said column for deriving an electrical signal indicative of the pressure in the space above the topmost plate; second transducer means connected to the condensate receiver for deriving an electrical signal indicative of the rate of change of condensate in said condensate receiver; third transducer means connected to said third means for deriving an electrical signal indicative of the rate at which products are withdrawn from the system through said third means; fourth transducer means connected to said reflux line for deriving an electrical signal indicative of the flow rate of reflux through said reflux line into said fractionating column; computer means connected to said first, second, third, and fourth transducer means to derive an output indication indicative of the sum of the products evolved from the system through said third means, the rate of reflux flow, and the rate of change of liquids in said condensate receiver, divided by the product of the entrainment constant of the fractionating column and the square root of the pressure in the space above the topmost fractionating plate; and means connected to said valve means and said computer means for controlling said valve means with said output indication to bring said output indication to a value corresponding to a value of unity for the ratio of said sum to said product.

5. The method of operating a fractionating system having a fractionating column including a plurality of vertically disposed fractionating plates, an overhead products line from the column feeding a condensate receiver, and a reflux line for returning a portion of the liquid products from the condensate receiver to the fractionating column, said method comprising: measuring the flow rate of overhead products withdrawn from the fractionating system, the rate of change of liquids in the condensate receiver, the absolute pressure in the space in the column above the topmost plate, and the flow rate of reflux into the column, measuring the entrainment constant of the column; producing a first electrical signal indicative of the sum of said flow rate of products, said rate of change of liquids into the condensate receiver, and said flow rate of reflux; producing a second electrical signal indicative of the product of said entrainment constant and the square root of the absolute pressure in the space above the top-most fractionating plate producing a third electrical signal indicative of the ratio between said first and second electrical signals; and regulating the rate of flow of reflux in accordance with variations in said third electrical signal to keep said third electrical signal at a value corresponding to a value of unity for said ratio.

6. The method of operating a fractionating system having a fractionating column including a plurality of vertically disposed fractionating plates, an overhead products line from the column feeding a condensate receiver, and a reflux line for returning a portion of the liquid products from the condensate receiver to the fractionating column, said method comprising: measuring the flow rate of overhead products withdrawn from the fractionating system, the rate of change of liquids in the condensate receiver, the absolute pressure in the space in the column above the topmost plate, and the flow rate of reflux into the column; producing a control signal indicative of the sum of said flow rate of products, said rate of change of liquids in the condensate receiver, and said flow rate of reflux, divided by the product of said entrainment constant and the square root of the absolute pressure in the space above the topmost fractionating plate of said column; and regulating the rate of flow of reflux in accordance with variations in said control signal to keep the ratio of said sum to said product as near as possible to but less than a value of unity.

No references cited.